US011890727B2

(12) United States Patent
Murui et al.

(10) Patent No.: US 11,890,727 B2
(45) Date of Patent: *Feb. 6, 2024

(54) ELECTRIC POWER TOOL

(71) Applicant: Panasonic Intellectual Property Management Co., Ltd., Osaka (JP)

(72) Inventors: Itaru Murui, Mie (JP); Hiroaki Murakami, Kyoto (JP); Mitsumasa Mizuno, Osaka (JP); Akiko Honda, Osaka (JP); Satoshi Kajiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

This patent is subject to a terminal disclaimer.

(21) Appl. No.: 17/556,488

(22) Filed: Dec. 20, 2021

(65) Prior Publication Data

US 2022/0111498 A1 Apr. 14, 2022

Related U.S. Application Data

(63) Continuation of application No. 16/487,794, filed as application No. PCT/JP2017/043092 on Nov. 30, 2017, now Pat. No. 11,235,445.

(30) Foreign Application Priority Data

Feb. 24, 2017 (JP) ................................ 2017-034154

(51) Int. Cl.
*B25B 21/02* (2006.01)
*B25B 23/14* (2006.01)

(52) U.S. Cl.
CPC .......... *B25B 21/02* (2013.01); *B25B 23/1405* (2013.01)

(58) Field of Classification Search
CPC . B25B 21/00; B25B 21/02; B25F 5/00; B25F 5/001; F16D 41/10; F16D 7/02; F16H 49/00; H02K 49/102
See application file for complete search history.

(56) References Cited

U.S. PATENT DOCUMENTS 2,943,216 A * 6/1960 Spodig ................. B25D 11/064 173/117
3,150,725 A * 9/1964 Hornschuch ............ B25B 21/02 464/29

(Continued)

FOREIGN PATENT DOCUMENTS

EP 1462219 A1 9/2004
EP 1677022 A1 7/2006

(Continued)

OTHER PUBLICATIONS

International Search Report issued in corresponding International Patent Application No. PCT/JP2017/043092, with English translation.

(Continued)

*Primary Examiner* — Nathaniel C Chukwurah
(74) *Attorney, Agent, or Firm* — Rimon P.C.

(57) ABSTRACT

An electric power tool includes: a driving shaft that is rotated by a motor; an output shaft on which a front-end tool is attachable; and a torque transmission mechanism that transmits a torque produced by the rotation of the driving shaft to the output shaft. The torque transmission mechanism includes a magnet coupling including a driving magnet member coupled to a side of the driving shaft and a driven magnet member coupled to a side of the output shaft, and the driving magnet member and the driven magnet member are provided such that respective magnetic surfaces face each (Continued)

20 other, S-poles and N-poles being alternately arranged on each of the magnetic surfaces.

18 Claims, 7 Drawing Sheets

(56) References Cited

U.S. PATENT DOCUMENTS

| | | | | |
|---|---|---|---|---|
| 3,499,496 | A * | 3/1970 | Vieths | B23G 1/46 173/19 |
| 6,695,070 | B1 | 2/2004 | Gokturk et al. | |
| 6,918,449 | B2 | 7/2005 | Shinagawa et al. | |
| 6,945,337 | B2 | 9/2005 | Kawai et al. | |
| 7,216,723 | B2 * | 5/2007 | Ohtsu | B25B 21/026 310/23 |
| 11,235,445 | B2 * | 2/2022 | Murui | B25B 21/026 |
| 2005/0109519 | A1 | 5/2005 | Kawai et al. | |

FOREIGN PATENT DOCUMENTS

| | | | |
|---|---|---|---|
| JP | H09-254046 | A | 9/1997 |
| JP | 2004-291136 | A | 10/2004 |
| JP | 2012-245463 | A | 12/2012 |
| JP | 2015-113944 | A | 6/2015 |

OTHER PUBLICATIONS

U.S. PTO Non-Final Office Action issued in related parent U.S. Appl. No. 16/487,794, dated Feb. 19, 2021.

U.S. PTO Non-Final Office Action issued in related parent U.S. Appl. No. 16/487,794, dated Jun. 14, 2021.

U.S. PTO Notice of Allowance issued in related parent U.S. Appl. No. 16/487,794, dated Sep. 21, 2021.

Entire U.S. PTO associated with related parent U.S. Appl. No. 16/487,794, filed Aug. 21, 2019.

Extended European Search Report issued in corresponding European Patent Application No. 17897675.9, dated Jan. 30, 2020.

* cited by examiner

ELECTRIC POWER TOOL

CROSS-REFERENCE TO RELATED APPLICATIONS

This is a Continuation of U.S. patent application Ser. No. 16/487,794, filed on Aug. 21, 2019, now U.S. Pat. No. 11,235,445, which is the U.S. National Phase under 35 U.S.C. § 371 of International Application No. PCT/JP2017/043092, filed on Nov. 30, 2017, which claims the benefit of Japanese Application No. 2017-034154, filed on Feb. 24, 2017, the entire contents of each are hereby incorporated by reference.

TECHNICAL FIELD

The present disclosure relates to an electric power tool adapted to transmit a torque produced by the rotation of a driving shaft to an output shaft so as to rotate a front-end tool.

BACKGROUND ART

Patent document 1 discloses a fastening tool including a torque clutch mechanism configured such that a planetary gear mechanism as a deceleration mechanism is coupled to a rotary shaft of a motor and adapted to interrupt power transmission to an output shaft by idling a ring gear in the planetary gear mechanism is provided. Further, patent document 2 discloses a rotary impact tool in which a hammer is attached to the driving shaft via a cam mechanism and the hammer applies a striking impact in the rotational direction to the anvil to rotate the output shaft when a load of a predetermined value or greater is exerted on the output shaft.

PATENT LITERATURE

[patent document 1] JP2015-113944
[patent document 2] JP2005-118910

SUMMARY OF INVENTION

Technical Problem

A related-art electric power tool such as a drill driver and an impact driver employs a structure for transmitting a torque mechanically and so produces noise when used. In particular, a rotary impact tool such as a mechanical impact driver produces a large impact noise when the hammer strikes the anvil. Therefore, improvement in quietness of electric power tools is called for.

The present disclosure addresses the issue discussed above and a purpose thereof is to provide an electric power tool having excellent quietness.

Solution to Problem

An electric power tool according to an embodiment of the present disclosure includes: a driving shaft that is rotated by a motor; an output shaft on which a front-end tool is attachable; and a torque transmission mechanism that transmits a torque produced by the rotation of the driving shaft to the output shaft. The torque transmission mechanism includes a magnet coupling including a driving magnet member coupled to a side of the driving shaft and a driven magnet member coupled to a side of the output shaft. The driving magnet member and the driven magnet member are provided such that respective magnetic surfaces face each other, S-poles and N-poles being alternately arranged on each of the magnetic surfaces.

DESCRIPTION OF EMBODIMENTS

Figure 1:
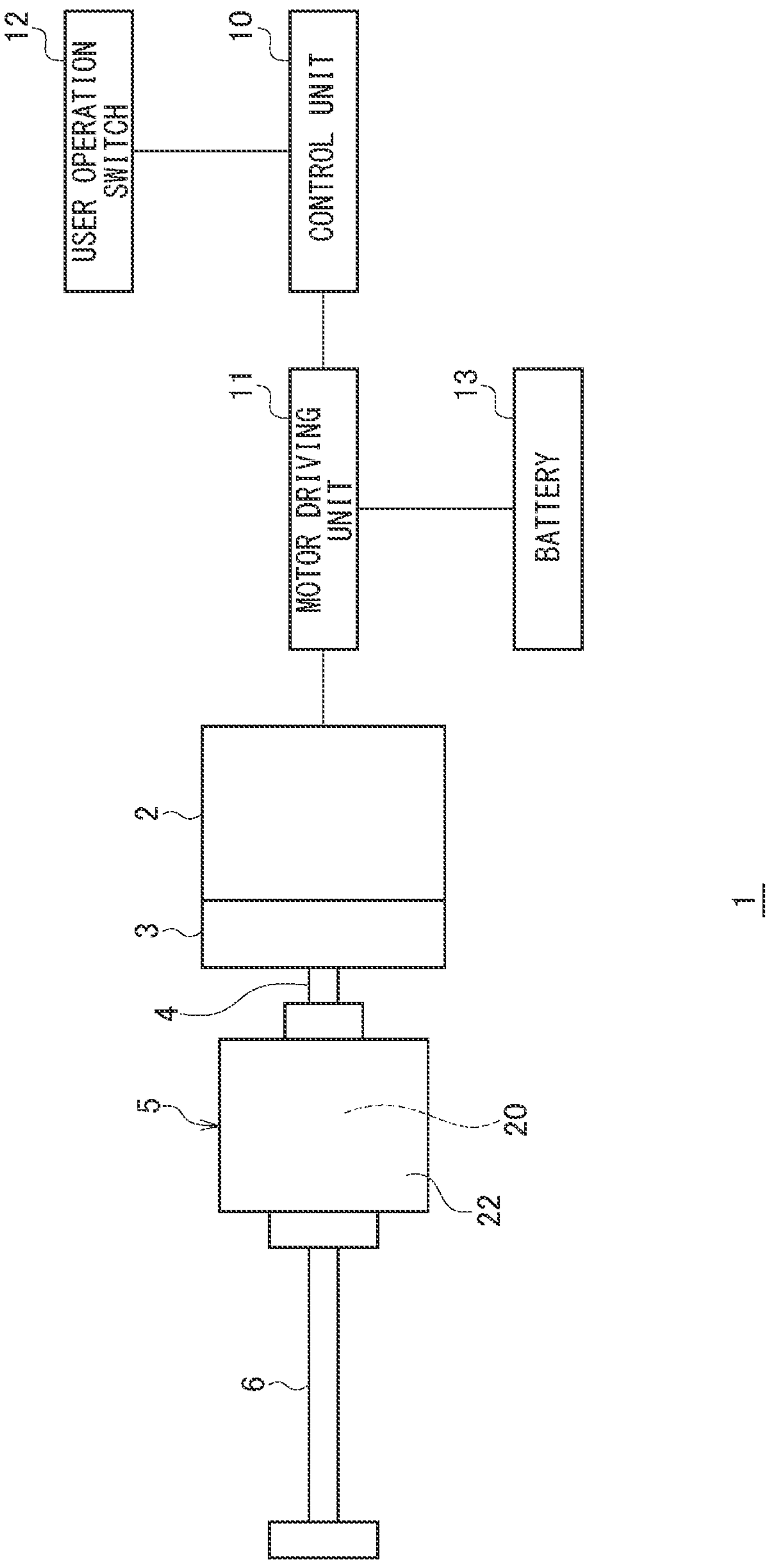
FIG. 1 shows an exemplary configuration of an electric power tool according to an embodiment.

FIG. 1 shows an exemplary configuration of an electric power tool 1 according to an embodiment of the present disclosure. The electric power tool 1 is a rotary tool in which a motor 2 is a driving source and includes a driving shaft 4 rotated by the motor 2, an output shaft 6 on which a front-end tool can be attached, and a torque transmission mechanism 5 for transmitting the torque produced by the rotation of the driving shaft 4 to the output shaft 6. In the electric power tool 1, power is supplied by a battery 13 built in a battery pack. The motor 2 is driven by a motor driving unit 11, and the rotation of the rotary shaft of the motor 2 is decelerated by a decelerator 3 and transmitted to the driving shaft 4.

The electric power tool 1 according to the embodiment includes a magnet coupling 20 provided as the torque transmission mechanism 5 to enable contactless torque transmission.

Figure 2:
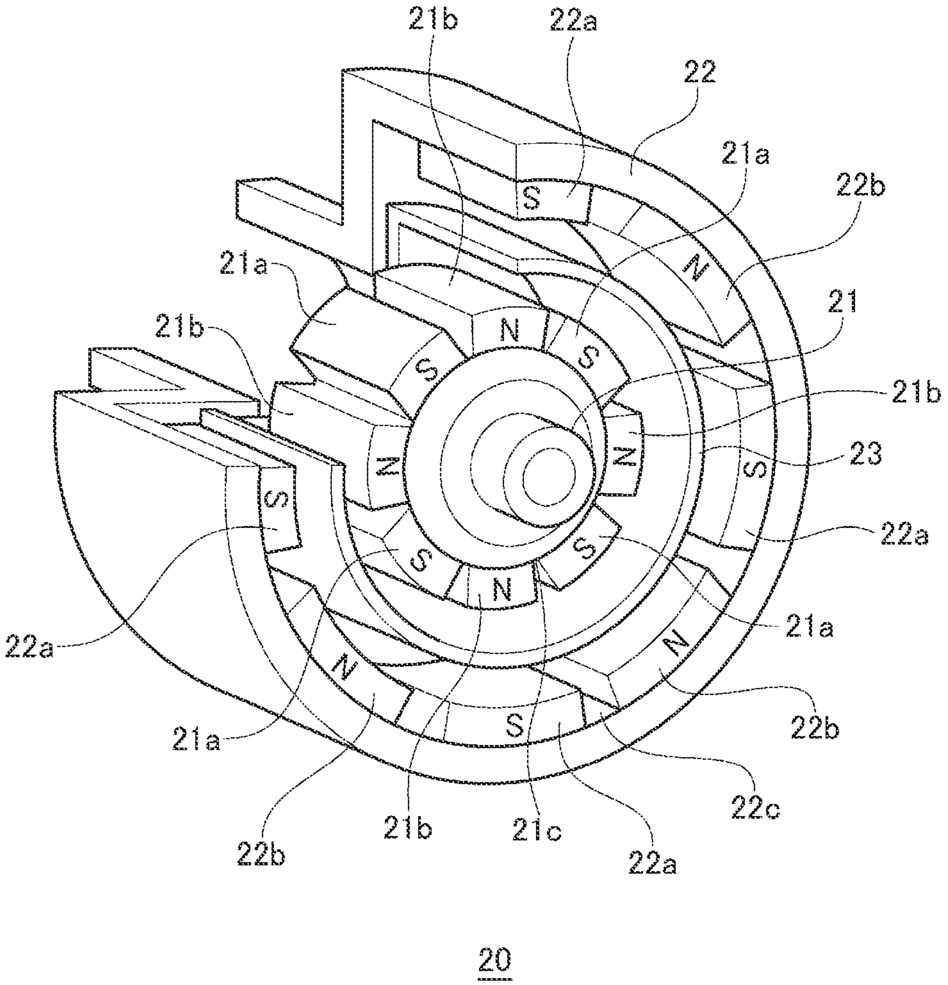
FIG. 2 shows an exemplary internal structure of the magnet coupling.

FIG. 2 shows an exemplary internal structure of the magnet coupling 20. FIG. 2 shows a perspective cross section in which a part of the cylinder-type magnet coupling 20 having an inner rotor and an outer rotor is cut out. S-poles and N-poles are alternately arranged adjacent to each other in the circumferential direction on the outer circumferential surface of the inner rotor cylinder and on the inner circumferential surface of the outer rotor cylinder. The magnet coupling 20 realizes superbly quiet torque transmission by magnetically transmitting the torque produced by the rotation of the driving shaft 4 to the output shaft 6. FIG. 2 shows the magnet coupling 20 of an eight-pole type, but the number of poles is not limited to eight.

The magnet coupling 20 includes a driving magnet member 21 coupled to the side of the driving shaft 4, a driven magnet member 22 coupled to the side of the output shaft 6, and a partition wall 23 provided between the driving magnet member 21 and the driven magnet member 22. In the magnet coupling 20 according to the embodiment, the driving magnet member 21 is an inner rotor, and the driven magnet member 22 is an outer rotor. Alternatively, the driving magnet member 21 may be an outer rotor, and the driven magnet member 22 may be an inner rotor.

The outer circumferential surface of the driving magnet member 21 that embodies the inner rotor forms a magnetic surface 21*c* on which S-pole magnets 21*a* and N-pole magnets 21*b* are alternately arranged. The inner circumferential surface of the driven magnet member 22 that embodies the outer rotor forms a magnetic surface 22*c* on which S-pole magnets 22*a* and N-pole magnets 22*b* are alternately arranged. The angles of arrangement pitches of magnetic poles are configured to be equal in the magnetic surface 21*c* and the magnetic surface 22*c*.

The driving magnet member 21 and the driven magnet member 22 are arranged coaxially such that the magnetic surface 21*c* and the magnetic surface 22*c* face each other. The attraction exerted between the S-pole magnet 21*a* and the N-pole magnet 22*b* and between the N-pole magnet 21*b* and the S-pole magnet 22*a* in the direction in which the magnets face defines the relative positions of the driving magnet member 21 and the driven magnet member 22.

The control unit 10 has the function of controlling the rotation of the motor 2. A user operation switch 12 is a trigger switch manipulated by a user. The control unit 10 turns the motor 2 on or off according to the manipulation of the user operation switch 12 and supplies the motor driving unit 11 with an instruction for driving determined by a manipulation variable of the user operation switch 12. The motor driving unit 11 controls the voltage applied to the motor 2 according to the instruction for driving supplied from the control unit 10 to adjust the number of revolutions of the motor.

By employing the magnet coupling 20, the electric power tool 1 such as a drill driver and a rotary impact tool is capable of transmitting a torque in a contactless manner and improving quietness of the tool. By alternately arranging S-poles and N-poles adjacent to each other on the magnetic surface 21*c* and alternately arranging S-poles and N-poles adjacent to each other on the magnetic surface 22*c*, the magnet coupling 20 is capable of transmitting a larger torque as compared with a case of providing the S-poles and the N-poles at a distance.

A description will now be given of a case of configuring the electric power tool 1 as a rotary impact tool.

The rotary impact tool has the function of applying a striking impact intermittently to the output shaft 6 in the rotational direction. This is met in the embodiment by allowing the magnet coupling 20 that forms the torque transmission mechanism 5 to have the function of applying an intermittent rotary impact force to the output shaft 6. The magnet coupling 20 applies an intermittent rotary impact force to the output shaft 6 by changing the magnetic force exerted between the magnetic surface 21*c* of the driving magnet member 21 and the magnetic surface 22*c* of the driven magnet member 22.

Exemplary Embodiment 1

Unless a load torque equal to or beyond the maximum torque that can be transmitted is exerted, the driving magnet member 21 and the driven magnet member 22 of the magnet coupling 20 are rotated in synchronization, substantially maintaining the relative positions in the rotational direction. As the tightening of the screw member progresses and a load torque beyond the maximum torque that can be transmitted by the magnet coupling 20 is exerted on the output shaft 6, however, the driven magnet member 22 will be unable to follow the driving magnet member 21. The state in which the driving magnet member 21 and the driven magnet member 22 are not synchronized will be referred to as "loss of synchronization". The magnet coupling 20 according to exemplary embodiment 1 applies an intermittent rotary striking force to the output shaft 6 by losing synchronization.

Figure 3:
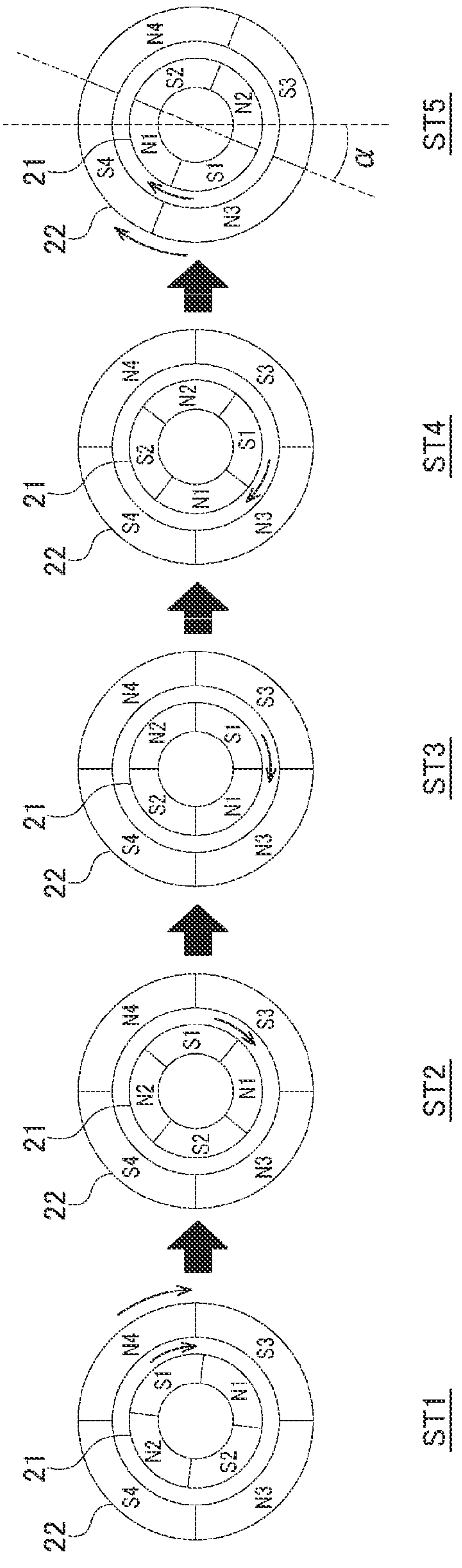
FIG. 3 shows a state transition of the magnet coupling.

FIG. 3 shows a state transition of the magnet coupling 20. FIG. 3 shows relative positions of the driving magnet member 21 and the driven magnet member 22 in the rotational direction in a 4-pole type magnet coupling 20. Magnets S1, S2 and magnets N1 and N2 are the S-pole magnet 21*a* and the N-pole magnet 21*b* in the driving magnet member 21, respectively, and magnets S3, S4 and magnets N3, N4 are the S-pole magnet 22*a* and the N-pole magnet 22*b* in the driven magnet member 22, respectively.

The state ST1 is defined as a state in which the driving magnet member 21 is rotated by the motor 2, and the driving magnet member 21 and the driven magnet member 22 are rotated in tandem, maintaining the relative synchronous positions. During the synchronous rotation, the driven magnet member 22 is rotated by following the rotation of the driving magnet member 21 so that the driven magnet member 22 is slightly behind the driving magnet member 21 in phase.

The state ST2 is defined as a state that occurs immediately before the driven magnet member 22 cannot follow the driving magnet member 21. When a load torque beyond the maximum torque that can be transmitted by the magnet coupling 20 is exerted on the output shaft 6 while the screw member is being tightened, the rotation of the driven magnet member 22 coupled to the output shaft 6 is stopped, and the driving magnet member 21 starts idling relative to the driven magnet member 22.

The state ST3 occurs while synchronization is being lost and is defined as a state in which the repulsive magnetic force exerted between the driving magnet member 21 and the driven magnet member 22 reaches the maximum level. Between the state ST2 and the state ST3, the driving magnet member 21 is rotated by the driving shaft 4. The state ST4 occurs while synchronization is being lost and is defined as a state in which the magnetic attraction rotates the driving magnet member at a speed higher than the speed at which the motor 2 rotates the driving shaft 4.

To focus on the magnet S1 for the illustrative purpose, the maximum repulsive magnetic force is exerted between the magnet S1 and the magnet S3 in the state ST3. As the driving magnet member 21 is rotated further beyond the state ST3, the magnet S1 is driven by the repulsive magnetic force of the magnet S3 in the rotational direction away from the magnet S3 and is attracted by the attractive magnetic force of the magnet N3 toward the magnet N3 in the rotational direction. Like the magnet S1, the other magnets S2, N1, and N2 in the driving magnet member 21 receive a magnetic force from the driven magnet member 22 similarly. In the state ST4, therefore, the driving magnet member 21 is rotated relative to the driven magnet member 22 at a speed higher than the speed at which the motor 2 rotates the driving shaft 4. When the driving magnet member 21 is coupled to the driving shaft 4 in such a manner that the driving magnet member 21 can be rotated relative to the driving shaft 4, the driving magnet member 21 will be rotated at a speed higher than the rotation speed of the driving shaft 4.

The state ST5 is defined as a state when the driving magnet member 21 is rotated as far as the synchronous position of the driven magnet member 22 and applies a rotary impact force to the driven magnet member 22. When the driving magnet member 21 is rotated relative to the driven magnet member 22 as far as the position where the magnet S1 and the magnet N3, the magnet N1 and the magnet S4, and the magnet S2 and the magnet N4, and the magnet N2 and the magnet S3 face each other, respectively, the rotation of the driving magnet member 21 is decelerated abruptly (or abruptly stopped). The position is where the attractive magnetic force between the driving magnet member 21 and the driven magnet member 22 is at the maximum level, and where the driving magnet member 21 and the driven magnet member 22 are in synchronization.

In the state ST5, the driven magnet member 22 receives inertia induced by the abrupt deceleration (or abrupt stop) of the driving magnet member 21. The inertial torque will produce a rotary impact force that rotates the driven magnet member 22, which had stopped its rotation, by an angle α. The relative positions of the S-poles and the N-poles in the state ST5 are substantially identical to the relative positions of the S-poles and the N-poles in the state ST1. The magnet coupling 20 applies an intermittent rotary impact force to the output shaft 6 by repeating the state transition from the state ST2 to the state ST5.

The driving magnet member 21 and the driving shaft 4 may be coupled such that relative rotation is disabled. However, since the driving magnet member 21 is rotated at a speed higher than the speed at which the motor 2 rotates the driving shaft 4 in the transition from the state ST4 to the state ST5, the motor 2 undergoes a high load. This load may affect the life of the motor 2 and send vibration to the hand of the worker.

Thus, the driving magnet member 21 may be coupled to the driving shaft 4 in such a manner that relative rotation is enabled. This allows the driving magnet member 21 to rotate at a high speed in the transition from the state ST4 to the state ST5 without being bounded by the driving shaft 4 and increases the inertial torque applied to the driven magnet member 22.

Figure 4A:
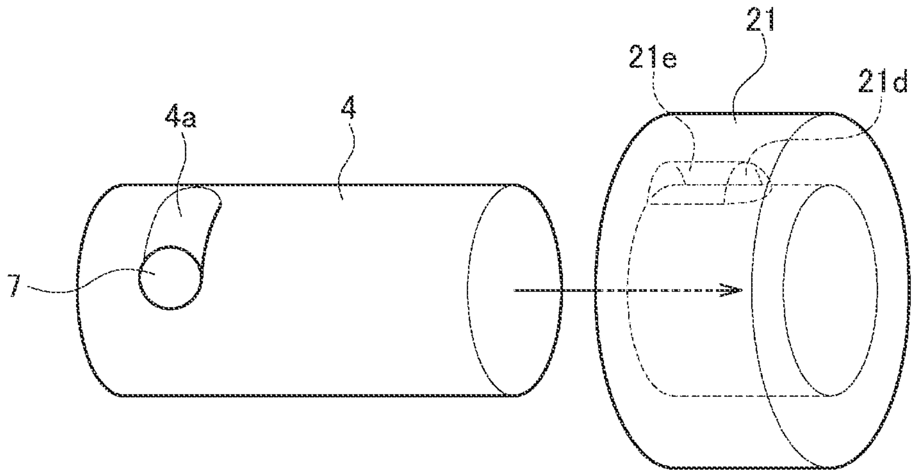
FIGS. 4A and 4B show an exemplary structure for coupling the driving magnet member to the driving shaft in such a manner that relative rotation is enabled.
Figure 4B:
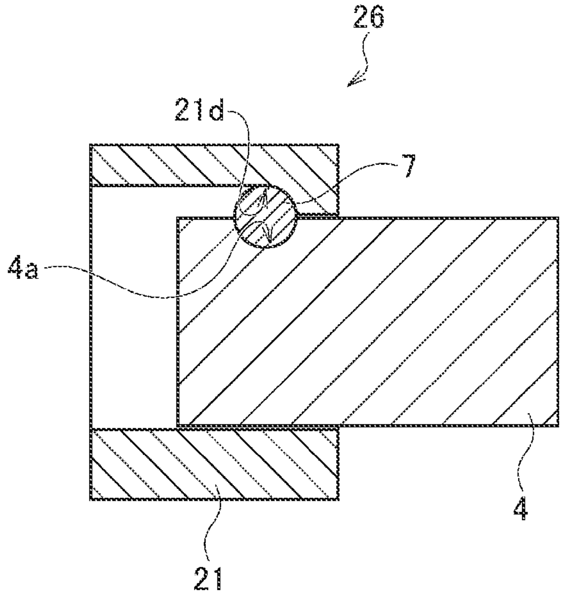

FIGS. 4A and 4B show an exemplary coupling structure for coupling the driving magnet member 21 to the driving shaft 4 in such a manner that relative rotation is enabled. FIG. 4A shows parts of the driving shaft 4 and the driving magnet member 21, and FIG. 4B shows a cross section of an assembly of the driving shaft 4 and the driving magnet member 21.

The driving shaft 4 has a groove 4*a* formed in the circumferential direction of the outer circumference, and the driving magnet member 21 has a ball insertion groove 21*e* and a ball retention part 21*d* formed in the axial direction of the inner circumferential surface. The driving shaft 4 is inserted in an insertion hole of the driving magnet member 21 from the back end side while a steel ball 7 is placed in the groove 4*a*. The steel ball 7 advances beyond the ball insertion groove 21*e* into the ball retention part 21*d*.

As shown in FIG. 4B, the steel ball 7 is retained in a space formed between the groove 4*a* of the driving shaft 4 and the ball retention part 21*d* of the driving magnet member 21 while the driving magnet member 21 is mounted on the outer circumference of the driving shaft 4. The groove 4*a*, the ball retention part 21*d*, and the steel ball 7 provided therebetween form a "coupling structure 26".

The relative axial positions of the driving shaft 4 and the magnet coupling 20 assembled in the electric power tool 1 are fixed, and the relative axial positions of the driving shaft 4 and the driving magnet member 21 remain unchanged. Thus, the driving magnet member 21 can be rotated relative to the driving shaft 4 in a range defined by the groove 4*a*, by coupling the driving magnet member 21 to the driving shaft 4 via the steel ball 7 placed in the groove 4*a* formed in the circumferential direction of the driving shaft 4.

A description will now be given of the operation of the coupling structure 26.

When the motor 2 is rotated as the user pulls the user operation switch 12, the driving shaft 4 is rotated via the decelerator 3. The rotation of the driving shaft 4 is transmitted to the driving magnet member 21 via the steel ball 7 set between the groove 4*a* of the driving shaft 4 and the ball retention part 21*d* of the driving magnet member 21. While the driving shaft 4 and the driving magnet member 21 are rotated in tandem, the steel ball 7 is located at the first end opposite to the direction of rotation of the driving shaft 4 and transmits the rotation of the driving shaft 4 to the driving magnet member 21.

As described with reference to FIG. 3, when a load torque beyond the maximum torque that can be transmitted by the magnet coupling 20 is exerted on the output shaft 6, the rotation of the driven magnet member 22 coupled to the output shaft 6 is stopped, causing the magnet coupling 20 to start losing synchronization.

During the transition from the state ST2 to the state ST3, the steel ball 7 is located at the first end of the groove 4*a*, and the driving shaft 4 and the driving magnet member 21 are rotated in tandem. Meanwhile, during the transition from the state ST3 to the state ST5, the driving magnet member 21 is rotated by the magnetic force at a speed higher than the rotation speed of the driving shaft 4 driven by the motor 2. Therefore, the steel ball 7 moves from the first end of the groove 4*a* to the other second end. In the state ST5, the rotation of the driving magnet member 21 is decelerated abruptly (or abruptly stopped), and then the rotation of the driving shaft 4 catches up the rotation of the driving magnet member 21, which causes the steel ball 7 to be located at the first end of the groove 4*a* again and transmits the rotation of the driving shaft 4 to the driving magnet member 21. Thus, by using the coupling structure 26 to couple the driving magnet member 21 to the driving shaft 4 so as to enable relative rotation, the driving magnet member 21 is not bounded by the driving shaft 4 from the state ST3 through the state ST5, and the rotation speed of the driving magnet member 21 is increased accordingly. This ensures a large rotary impact force that the magnet coupling 20 applies to the output shaft 6 intermittently.

The angle through which the driving magnet member 21 and the driving shaft 4 can rotate relative to each other is designed with reference to the angle of arrangement pitch of magnetic poles on the magnetic surface 21*c* of the driving magnet member 21. In a 4-pole type magnet coupling 20, the angle of arrangement pitch of magnetic poles is 90°, and the angle of arrangement pitch in an 8-pole type is 45°.

One design idea is to configure the angle through which relative rotation is possible to be substantially equal to the angle of arrangement pitch of magnetic poles. The angle of arrangement pitch may be called "the angular pitch of the magnetic pole arrangement." As described with reference to FIG. 3, the driving magnet member 21 is rotated by the driving shaft 4 during the transition from the state ST2 to the state ST3. During the transition from the state ST3 to the state ST5, the driving magnet member 21 is rotated at a high speed by the magnetic force. Therefore, the driving magnet member 21 may be enabled to rotate relative to the driving shaft 4 from the state ST3 to the state ST5. Thus, the angle through which relative rotation is enabled may be defined to be substantially equal to the angular pitch of magnetic pole arrangement.

In a similar design idea, the angle through which relative rotation is enabled may be defined to be smaller than the angular pitch of magnetic pole arrangement. As described above, the driving magnet member 21 may be enabled to rotate relative to the driving shaft 4 from the state ST3 to the state ST5. During this transition, the driving shaft 4 is also rotated in the same direction of rotation. Therefore, the angle through which relative rotation is enabled may be defined to an angle derived from subtracting the angle through which the driving shaft 4 rotates from the state ST3 to the state ST5 from the angular pitch of magnetic pole arrangement.

Another design idea is to define the angle through which relative rotation is enabled to be larger than the angular pitch of magnetic pole arrangement. The driving magnet member 21 is rotated by the magnetic force at a speed higher than the rotation speed of the driving shaft 4 from the state ST3 to the state ST5. Thus, according to the two design ideas mentioned above, the steel ball 7 may collide with the second end of the groove 4*a* to generate a collision noise while the steel ball 7 moves from the first end to the second end of the groove 4*a* at a high speed. Accordingly, the angle through which relative rotation is enabled, i.e., the circumferential angle of the groove 4*a*, may be defined to be larger than the angular pitch of magnetic pole arrangement so as to prevent the steel ball 7 from colliding with the second end of the groove 4*a*.

Exemplary Embodiment 2

In exemplary embodiment 2, the electric power tool 1 includes a moving mechanism that changes the relative positions of the magnetic surface 21*c* of the driving magnet member 21 and the magnetic surface 22*c* of the driven magnet member 22 in the magnet coupling 20. The magnet coupling 20 according to exemplary embodiment 2 is configured such that the moving mechanism moves the magnetic surface 21*c* and the magnetic surface 22*c* relative to each other so as to change the magnetic force exerted between the magnetic surface 21*c* and the magnetic surface 22*c*, thereby applying an intermittent rotary impact force to the output shaft 6.

Figure 5A:
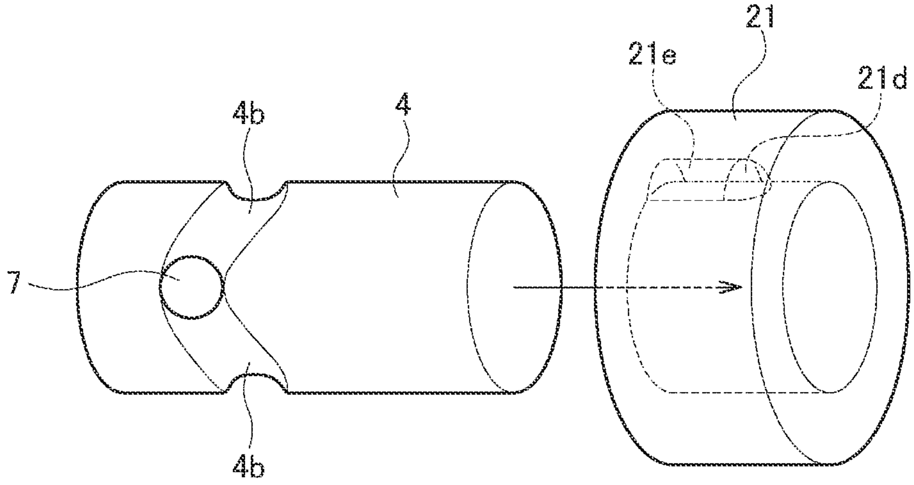
FIGS. 5A and 5B show an exemplary moving mechanism for changing the relative positions of the two magnetic surfaces.
Figure 5B:
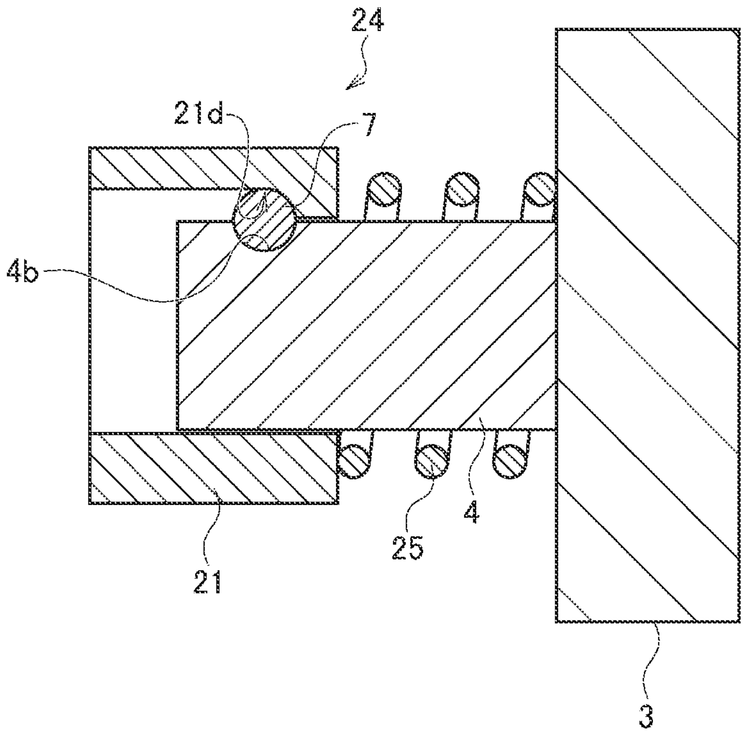

FIGS. 5A and 5B show an exemplary moving mechanism for changing the relative positions of the two magnetic surfaces. FIG. 5A shows parts of the driving shaft 4 and the driving magnet member 21, and FIG. 5B shows a cross section of the moving mechanism in which the driving shaft 4 and the driving magnet member 21 are assembled.

In a moving mechanism 24, the driving shaft 4 includes two guide grooves 4*b* formed on the outer circumferential surface of the driving shaft 4. The driving magnet member 21 includes a ball insertion groove 21*e* and a ball retention part 21*d* formed in the axial direction of the inner circumferential surface of the driving magnet member 21. The two guide grooves 4*b* have the same shape and are contiguously arranged in the circumferential direction and are formed to have a V-shape or a U-shape as viewed from the end of the tool. In other words, the guide grooves 4*b* are symmetrically inclined from the forefront part in the diagonally backward direction.

The driving shaft 4 is inserted in an insertion hole of the driving magnet member 21 from the back end side while the steel ball 7 is placed in the guide groove 4*b*. The steel ball 7 advances beyond the ball insertion groove 21*e* into the ball retention part 21*d*.

As shown in FIG. 5B, the steel ball 7 is retained in a space formed between the guide groove 4*b* and the ball retention part 21*d* while the driving magnet member 21 is mounted on the outer circumference of the driving shaft 4. The guide groove 4*b* of the driving shaft 4, the ball retention part 21*d* of the driving magnet member 21, and the steel ball 7 provided therebetween form a “cam structure”. The steel ball 7 couples the driving magnet member 21 to the driving shaft 4 in such a manner that the driving magnet member 21 is rotatable around the line of rotational axis of the driving shaft 4 and is movable in the direction of the line of rotational axis.

A spring member 25 is interposed between the decelerator 3 and the driving magnet member 21. The spring member 25 biases the driving magnet member 21 in the direction of the end of the tool. In exemplary embodiment 2, the cam structure and the spring member 25 form the moving mechanism 24. Before the screw member starts to be tightened, the spring member 25 of the moving mechanism 24 maintains the steel ball 7 pressed against the forefront part of the guide groove 4*b*. When a load torque exerted on the output shaft 6 grows large while the screw member is being tightened, the steel ball 7 moves from the forefront part of the guide groove 4*b* toward the back end along the inclined groove. This will cause the driving magnet member 21 to recede relative to the driving shaft 4.

A description will now be given of the operation of the moving mechanism 24.

When the motor 2 is rotated as the user pulls the user operation switch 12, the driving shaft 4 is rotated via the decelerator 3. The rotation of the driving shaft 4 is transmitted to the driving magnet member 21 via the steel ball 7 set between the guide groove 4*b* of the driving shaft 4 and the ball retention part 21*d* of the driving magnet member 21. While the driving shaft 4 and the driving magnet member 21 are rotated in tandem, the steel ball 7 is located at the forefront part of the guide groove 4*b* and transmits the rotation torque of the driving shaft 4 to the driving magnet member 21.

As the tightening of the screw member progresses and the load torque exerted on the output shaft 6 exceeds a predetermined value, the steel ball 7 moves backward along the guide groove 4*b* against the biasing force of the spring member 25 so that the driving magnet member 21 moves in the backward direction. The axial movement of the driving magnet member 21 relative to the driven magnet member 22 weakens the magnetic force exerted between the magnetic surface 21*c* of the driving magnet member 21 and the magnetic surface 22*c* of the driven magnet member 22.

As the magnetic force exerted between the magnetic surface 21*c* and the magnetic surface 22*c* is weakened, the driving magnet member 21 rotates and advances due to the biasing force of the spring member 25 and moves into the driven magnet member 22. The rotation of the driving magnet member 21 is decelerated abruptly (or abruptly stopped) at the synchronous position of the driven magnet member 22, i.e., at the position where the attractive magnetic force between the driving magnet member 21 and the driven magnet member 22 is at the maximum level. This exerts an inertial torque on the driven magnet member 22, and the inertial torque will produce a rotary impact force that rotates the driven magnet member 22. As the moving mechanism 24 repeatedly causes the driving magnet member 21 to enter and leave the driven magnet member 22, the magnet coupling 20 applies an intermittent rotary impact force to the output shaft 6.

In exemplary embodiment 2, the moving mechanism 24 operates to change the relative axial positions of the driving magnet member 21 and the driven magnet member 22. Alternatively, the moving mechanism 24 may operate to change the relative circumferential positions of the driving magnet member 21 and the driven magnet member 22.

Exemplary Embodiment 3

In exemplary embodiment 3, the magnet coupling includes an electromagnet adapted to generate a magnetic force when energized.

Figure 6:
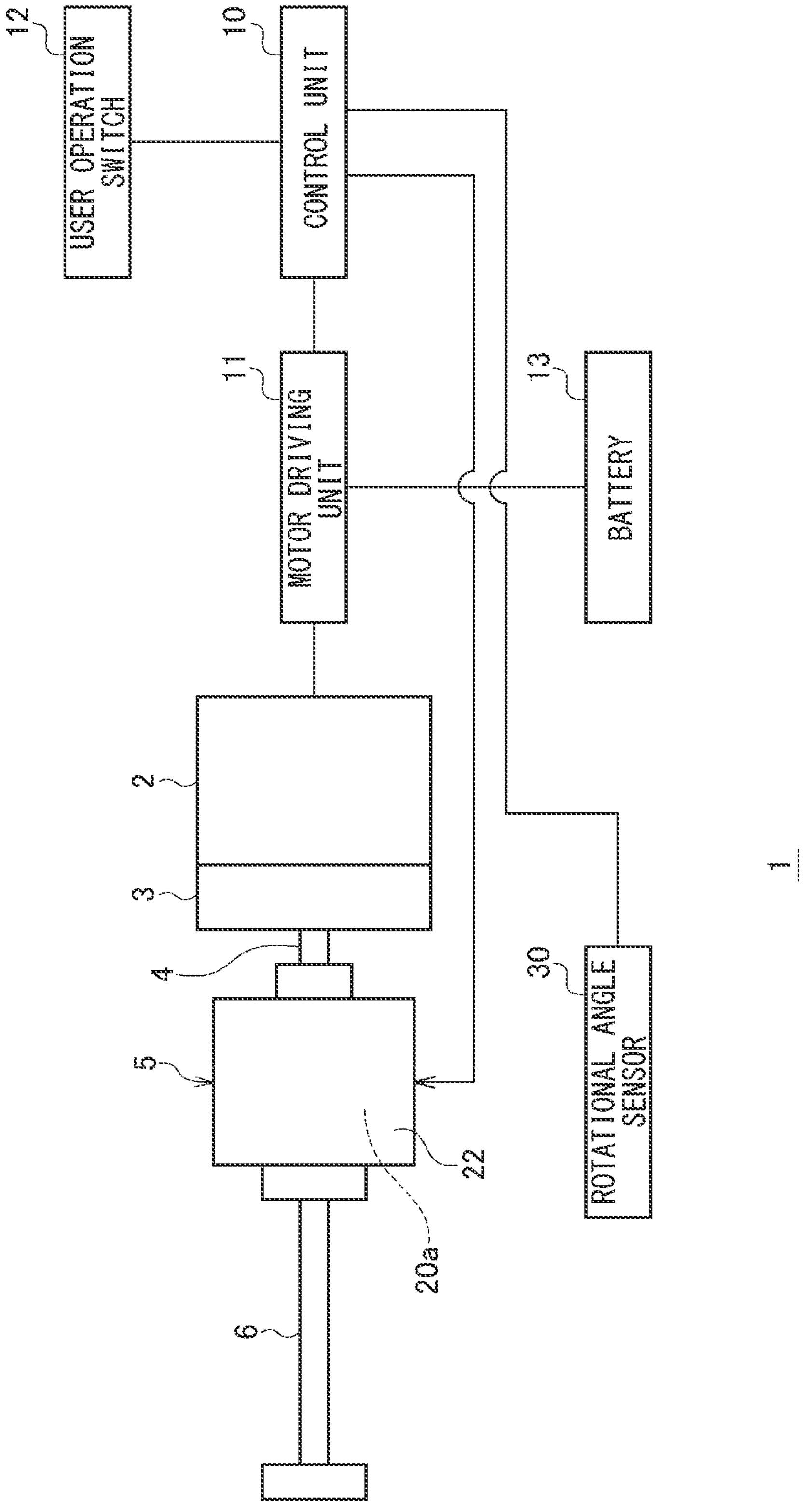
FIG. 6 shows another exemplary configuration of the electric power tool according to the embodiment.

FIG. 6 shows another exemplary configuration of the electric power tool 1 according to the embodiment of the present disclosure. The electric power tool 1 includes the driving shaft 4 rotated by the motor 2, the output shaft 6 on which a front-end tool can be attached, and the torque transmission mechanism 5 for transmitting the torque produced by the rotation of the driving shaft 4 to the output shaft 6. In the electric power tool 1, power is supplied by the battery 13 built in a battery pack. The motor 2 is driven by the motor driving unit 11, and the rotation of the rotary shaft of the motor 2 is decelerated by the decelerator 3 and transmitted to the driving shaft 4.

The electric power tool 1 includes a magnet coupling 20*a* provided as the torque transmission mechanism 5 to enable contactless torque transmission. The magnet coupling 20*a* may be of a cylinder type having an inner rotor and an outer rotor. The magnet coupling 20*a* includes the driving magnet member 21 and the driven magnet member 22 as shown in FIG. 2. At least one of the magnetic surface 21*c* of the driving magnet member 21 and the magnetic surface 22*c* of the driven magnet member 22 is provided with an electromagnet. In the case an electromagnet is provided in one of the two magnetic surfaces, a permanent magnet may be provided on the other, but the other surface may be provided with an electromagnet. The angular pitch of magnetic pole arrangement on the magnetic surface 21*c* may be configured to be equal to that of the magnetic surface 22*c*.

In exemplary embodiment 3, the control unit 10 has the function of controlling the rotation of the motor 2 and also has the function of controlling a current supplied to the electromagnet. In exemplary embodiment 3, the control unit 10 controls a current supplied to the electromagnet to cause the magnet coupling 20*a* to apply an intermittent rotary impact force to the output shaft 6.

To effect the current control of the electromagnet by the control unit 10, the electric power tool 1 includes a rotational angle sensor 30 adapted to sense the relative angle between the magnetic surface 21*c* of the driving magnet member 21 and the magnetic surface 22*c* of the driven magnet member 22. This allows the control unit 10 to control a current supplied to the electromagnet in accordance with the output of the rotational angle sensor 30. A description will now be given of the control performed by the control unit 10 with reference to the state transition shown in FIG. 3.

When the rotational angle sensor 30 senses that the driving magnet member 21 starts idling relative to the driven magnet member 22 (state ST2), the control unit 10 stops supplying a current to the electromagnet. In other words, the control unit 10 stops supplying a current to the electromagnet when the rotational angle sensor 30 senses that relative angle between the magnetic surface 21*c* and the magnetic surface 22*c* is deviated from the relative angle that occurs in the synchronous state in a range smaller than ½ times the angular pitch of magnetic pole arrangement on the magnetic surface 21*c*. The control unit 10 continues to rotate the motor 2 even after the supply of a current to the electromagnet is stopped. Therefore, the deviation of the relative angle between the magnetic surface 21*c* and the magnetic surface 22*c* from the synchronous state will grow larger since the supply of a current to the electromagnet is stopped.

When the rotational angle sensor 30 senses that the relative angle between the magnetic surface 21*c* and the magnetic surface 22*c* is deviated from the relative angular that occurs in the synchronous state in a range more than ½ times and less than the angular pitch of magnetic pole arrangement, the control unit 10 supplies a current to the electromagnet. The electromagnet forms a magnetic pole so that the state ST4 show in FIG. 3 occurs. This causes, as described in exemplary embodiment 1, the driving magnet member 21 to rotate relative to the driven magnet member 22 by the magnetic force. The driven magnet member 22 receives inertia and applies a rotary impact force on the output shaft 6 accordingly. By using an electromagnet in the magnet coupling 20 as described above, the control unit 10 can control an intermittent rotary impact force applied to the output shaft 6 as desired.

Described above is an explanation based on an embodiment. The embodiment is intended to be illustrative only and it will be understood by those skilled in the art that various modifications to constituting elements and processes could be developed and that such modifications are also within the scope of the present disclosure.

In the embodiment, the magnet coupling 20, 20*a* is described as being of a cylinder type having an inner rotor and an outer rotor. Alternatively, the magnet coupling 20, 20*a* may be of a disk type having two disks with their magnetic surfaces facing each other in the axial direction.

Figure 7A:
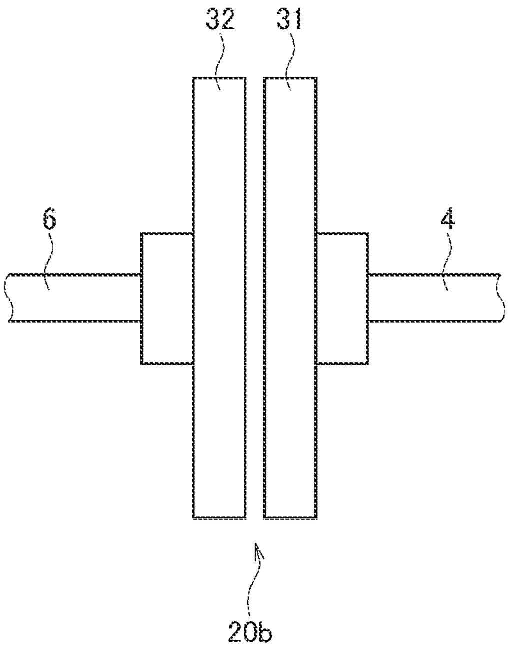
FIGS. 7A and 7B show another example of the magnet coupling.
Figure 7B:
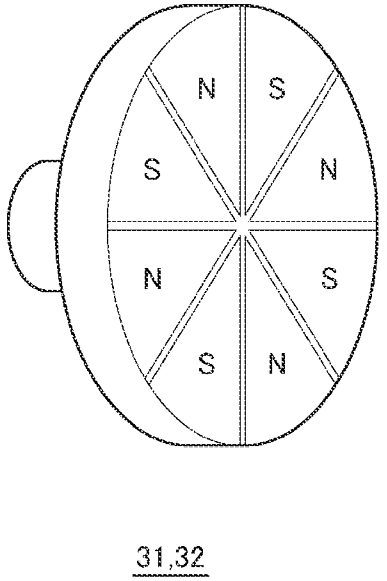

FIGS. 7A and 7B show another example of the magnet coupling 20*b*. FIG. 7A shows a side surface of the magnet coupling 20*b* of a disk type having an input side disk and an output side disk. FIG. 7B shows a magnetic surface of the input side disk or the output side disk. The disk surface of the input side disk and the disk surface of the output side disk are provided with S-poles and N-poles alternately arranged adjacent to each other in the circumferential direction. The magnet coupling 20*b* of a disk type also realizes superbly quiet torque transmission by transmitting the torque produced by the rotation of the driving shaft 4 to the output shaft 6 by the magnetic force. FIG. 7B shows the magnet coupling 20*b* of an 8-pole type, but the number of poles is not limited to eight.

The magnet coupling 20*b* includes a driving magnet member 31 and a driven magnet member 32, the driving magnet member 31 being coupled to the side of the driving shaft 4 and the driven magnet member 32 being coupled to the side of the output shaft 6. The disk surface of each of the driving magnet member 31 and the driven magnet member 32 forms a magnetic surface on which S-pole magnets and N-pole magnets are alternately arranged. In the magnet coupling 20*b*, the driving magnet member 31 and the driven magnet member 32 are arranged coaxially such that the respective magnetic surfaces face each other. The magnet coupling 20*b* of a disk type shown in FIGS. 7A and 7B can equally apply an intermittent rotary impact force to the output shaft 6 by being provided with the features described in exemplary embodiments 1-3.

An embodiment of the present disclosure is summarized below.

An electric power tool (1) according to an embodiment of the disclosure includes: a driving shaft (4) that is rotated by a motor (2); an output shaft (6) on which a front-end tool is attachable; and a torque transmission mechanism (5) that transmits a torque produced by the rotation of the driving shaft to the output shaft. The torque transmission mechanism (5) includes a magnet coupling (20, 20*a*, 20*b*) including a driving magnet member (21, 31) coupled to a side of the driving shaft (4) and a driven magnet member (22, 32) coupled to a side of the output shaft (6), and the driving magnet member and the driven magnet member are provided such that respective magnetic surfaces (21*c*, 22*c*) face each other, S-poles and N-poles being alternately arranged on each of the magnetic surfaces.

It is preferred that S-pole magnets and N-pole magnets be alternately arranged on the magnetic surface (21*c*, 22*c*) of each of the driving magnet member (21, 31) and the driven magnet member (22, 32). An electromagnet may be provided on the magnetic surface of at least one of the driving magnet member (21, 31) and the driven magnet member (22, 32).

It is preferred that the magnet coupling (20, 20*a*, 20*b*) have a function of applying an intermittent rotary impact force to the output shaft. The magnet coupling (20, 20*a*, 20*b*) may apply an intermittent rotary impact force to the output shaft by changing the magnetic force exerted between the magnetic surface of the driving magnet member and the magnetic surface of the driven magnet member.

The magnet coupling (20, 20*b*) may apply an intermittent rotary impact force to the output shaft by losing synchronization. The magnet coupling (20, 20*b*) may lose synchronization when a load torque beyond a predetermined value is applied to the output shaft. It is preferred that the driving magnet member (21, 31) be coupled to the driving so as to be rotatable relative to the driving shaft. An angle through which relative rotation of the driving magnet member (21, 31) and the driving shaft (4) is enabled may be substantially equal to an angular pitch of magnetic pole arrangement on the magnetic surface (21*c*) of the driving magnet member. An angle through which relative rotation of the driving magnet member (21, 31) and the driving shaft (4) is enabled may be smaller than an angular pitch of magnetic pole arrangement on the magnetic surface (21*c*) of the driving magnet member. An angle through which relative rotation of the driving magnet member (21, 31) and the driving shaft (4) is enabled may be larger than an angular pitch of magnetic pole arrangement on the magnetic surface (21*c*) of the driving magnet member. The driving magnet member (21, 31) may be coupled to the driving shaft (4) via a steel ball (7) provided in a groove (4*a*) formed in a circumferential direction of the driving shaft (4).

The electric power tool 1 may further include a moving mechanism (24) that changes relative positions of the magnetic surface (21*c*) of the driving magnet member (21, 31) and the magnetic surface (22) of the driven magnet member (22, 32) in the magnet coupling (20). The moving mechanism (24) may change relative axial positions of the driving magnet member (21, 31) and the driven magnet member (22, 32).

The electric power tool 1 may further include a control unit (10) that controls a current supplied to the electromagnet. The control unit may cause the magnet coupling (20*a*) to apply an intermittent rotary impact force to the output shaft by controlling a current supplied to the electromagnet. The electric power tool 1 may further include a rotational angle sensor (30) that senses a relative angle between the magnetic surface of the driving magnet member and the magnetic surface of the driven magnet member, and the control unit (10) may control a current supplied to the electromagnet in accordance with an output of the rotational angle sensor. The control unit may supply a current to the electromagnet when the rotational angle sensor senses that the relative angle between the two magnetic surfaces is deviated from a relative angle that occurs in a synchronous state in a range more than ½ times and less than an angular pitch of magnetic pole arrangement on the magnetic surface of the driving magnet member.

REFERENCE SIGNS LIST

1 . . . electric power tool, 2 . . . motor, 4 . . . driving shaft, 4*a* . . . groove, 4*b* . . . guide groove, 5 . . . torque transmission mechanism, 6 . . . output shaft, 7 . . . steel ball, 10 . . . control unit, 20, 20*a*, 20*b* . . . magnet coupling, 21 . . . driving magnet member, 21*c* . . . magnetic surface, 22 . . . driven magnet member, 22*c* . . . magnetic surface, 24 . . . moving mechanism, 25 . . . spring member, 26 . . . coupling structure, 30 . . . rotational sensor, 31 . . . driving magnet member, 32 . . . driven magnet member

INDUSTRIAL APPLICABILITY

The present disclosure is applicable to the field of electric power tools.

The invention claimed is:

1. An electric power tool comprising:

a driving shaft that is rotated by a motor;

an output shaft on which a front-end tool is attachable; and a torque transmission mechanism that transmits a torque produced by the rotation of the driving shaft to the output shaft, wherein the torque transmission mechanism includes a magnet coupling including a driving magnet member coupled to a side of the driving shaft and a driven magnet member coupled to a side of the output shaft, the driving magnet member and the driven magnet member are provided such that respective magnetic surfaces face each other, S-poles and N-poles being alternately arranged on each of the magnetic surfaces, and the magnet coupling has a function of applying an intermittent rotary impact force to the output shaft.

2. The electric power tool according to claim 1, wherein the magnet coupling applies the intermittent rotary impact force to the output shaft by changing a magnetic force exerted between the magnetic surface of the driving magnet member and the magnetic surface of the driven magnet member.

3. The electric power tool according to claim 1, wherein the magnet coupling applies the intermittent rotary impact force to the output shaft by losing synchronization.

4. The electric power tool according to claim 3, wherein the magnet coupling loses synchronization when a load torque beyond a predetermined value is applied to the output shaft.

5. The electric power tool according to claim 3, wherein the driving magnet member is coupled to the driving shaft so as to be rotatable relative to the driving shaft.

6. The electric power tool according to claim 5 wherein an angle through which a relative rotation of the driving magnet member and the driving shaft is possible is substantially equal to an angle of arrangement pitch of magnetic poles on the magnetic surface of the driving magnet member.

7. The electric power tool according to claim 5, wherein an angle through which a relative rotation of the driving magnet member and the driving shaft is possible is smaller than an angle of arrangement pitch of magnetic poles on the magnetic surface of the driving magnet member.

8. The electric power tool according to claim 5, wherein an angle through which a relative rotation of the driving magnet member and the driving shaft is possible is larger than an angle of arrangement pitch of magnetic poles on the magnetic surface of the driving magnet member.

9. The electric power tool according to claim 5, wherein the driving magnet member is coupled to the driving shaft via a steel ball provided in a groove formed in the driving shaft in a circumferential direction.

10. The electric power tool according to claim 1, wherein S-pole magnets and N-pole magnets are alternately arranged on the magnetic surface of each of the driving magnet member and the driven magnet member.

11. The electric power tool according to claim 1, further comprising:

a moving mechanism that changes relative positions of the magnetic surface of the driving magnet member and the magnetic surface of the driven magnet member in the magnet coupling.

12. The electric power tool according to claim 11, wherein the moving mechanism changes relative axial positions of the driving magnet member and the driven magnet member.

13. The electric power tool according to claim 1, wherein an electromagnet is provided on the magnetic surface of at least one of the driving magnet member and the driven magnet member.

14. The electric power tool according to claim 13, further comprising:

a control unit that controls a current supplied to the electromagnet, wherein the control unit causes the magnet coupling to apply an intermittent rotary impact force to the output shaft by controlling the current supplied to the electromagnet.

15. The electric power tool according to claim 14, further comprising:

a rotational angle sensor that senses a relative angle between the magnetic surface of the driving magnet member and the magnetic surface of the driven magnet member, wherein the control unit controls the current supplied to the electromagnet in accordance with an output of the rotational angle sensor.

16. The electric power tool according to claim 15, wherein the control unit supplies the current to the electromagnet when the rotational angle sensor senses that the relative angle between the two magnetic surfaces is deviated from a relative angle that occurs in a synchronous state in a range more than ½ times and less than an angle of arrangement pitch of magnetic poles on the magnetic surface of the driving magnet member.

17. The electric power tool according to claim 1, wherein the driving magnet member is coupled to the driving shaft so as to be movable relative to the driving shaft in a direction of a rotational axis of the driving shaft.

18. The electric power tool according to claim 1, wherein the driving magnet member is rotatable around a line of rotational axis of the driving shaft and is movable in the direction of the line of rotational axis.

* * * * *